United States Patent
Winso et al.

(10) Patent No.: US 8,067,742 B2
(45) Date of Patent: Nov. 29, 2011

(54) APPARATUS AND METHOD FOR DETECTION, LOCATION, AND IDENTIFICATION OF GAMMA SOURCES

(75) Inventors: James H Winso, Escondido, CA (US); Michael D Fennell, San Diego, CA (US)

(73) Assignee: Space Micro Inc., San Diego, CA (US)

( * ) Notice: Subject to any disclaimer, the term of this patent is extended or adjusted under 35 U.S.C. 154(b) by 1162 days.

(21) Appl. No.: 11/808,648

(22) Filed: Jun. 12, 2007

(65) Prior Publication Data

US 2010/0168947 A1   Jul. 1, 2010

Related U.S. Application Data

(60) Provisional application No. 60/812,894, filed on Jun. 13, 2006.

(51) Int. Cl.
*G01T 1/00* (2006.01)
(52) U.S. Cl. .................................. 250/367
(58) Field of Classification Search .......... 250/367
See application file for complete search history.

(56) References Cited

U.S. PATENT DOCUMENTS

| | | | | |
|---|---|---|---|---|
| 3,436,539 A | * | 4/1969 | Wilcox | 250/367 |
| 3,539,806 A | * | 11/1970 | Humphrey | 250/366 |
| 7,321,121 B2 | * | 1/2008 | Testardi | 250/361 R |
| 2005/0104001 A1 | * | 5/2005 | Shah | 250/363.03 |
| 2005/0121618 A1 | * | 6/2005 | Fowler et al. | 250/394 |

* cited by examiner

*Primary Examiner* — Constantine Hannaher
(74) *Attorney, Agent, or Firm* — Robert P. Cogan; Continuum Law

(57) ABSTRACT

An apparatus for detecting and determining a source azimuth for gamma radiation includes at least two scintillation crystals at angular offsets and directed toward a common plane of detection, photodetectors adjacent to each of the scintillation crystals for converting the light response of the scintillation crystals into distinct electrical signals, and a digital processing system configured to analyze spectral data from each electrical signal produced for each crystal. The digital processing system monitors a finite number of spectral windows corresponding to a selected set of radioisotopes, and uses one or more of the electrical signals to determine a signal intensity and a likely source azimuth for a detected radioisotope in the plane of detection. Another scintillation crystal directed outside of the common plane of detection may be used for three-dimensional detection. Related methods for detection and location of gamma ray sources are discussed.

11 Claims, 10 Drawing Sheets ed coordinates in a known environment. The coordinates are calculated from the signal intensity, source azimuth data and compass data of the remote readout and

APPARATUS AND METHOD FOR DETECTION, LOCATION, AND IDENTIFICATION OF GAMMA SOURCES

CROSS-REFERENCE TO RELATED APPLICATIONS

This application claims the benefit of U.S. Provisional Patent Application No. 60/812,894 filed Jun. 13, 2006, the contents of which are hereby incorporated by reference in their entirety.

STATEMENT REGARDING FEDERALLY SPONSORED RESEARCH OR DEVELOPMENT

The captioned invention was developed under United States of America Department of Defense Small Business Innovation Research contract NBCHC060045.

BACKGROUND OF THE INVENTION

1. Field of the Invention

The present subject matter relates generally to radiation detection devices, and in particular to compact scintillation radiation detector ensembles that enable detection, identification and azimuth location of a radiation source in a single embodiment.

2. Related Art

The United States government has identified a vital need of law enforcement, first responder and military staff responsible for detecting and responding to radiological threats to the United States to advance the state of the art of available omni-directional radiation detection devices, such as radiation portals and hand-held devices which are sensitive enough to detect many threats, but lack the capability to rapidly determine the location of the radiation source. This problem is complicated by the fact that the terrestrial environment of concern includes significant naturally occurring radioactive material (NORM) and legitimate medical and industrial sources, which camouflage a threat source. Additionally the threat source will often be present in a scatter rich environment further masking the direction and energy of the source. The current information provided may be ambiguous and inadequate in both routine inspection and live threat response scenarios given that the main goal is to find the radiation source or sources quickly to determine the risk level and the appropriate response. It is also possible for a strong benign source to mask a relatively weaker hazardous source in a nearby location. Pertinent information could facilitate sound management of these tense situations, including whether there are one or multiple sources of interest, the azimuth relative to the detector of a gamma source, the location of this source, and the identity of the source. This information must be acquired quickly, so that it may be immediately communicated to the responsible command centers.

Currently available radiation detection and measurement equipment cover a wide range of specific tasks such as isotope identification in a hand-held package and personal radiation locators. However, these devices depend on observing the variation in response intensity as the sensor is moved closer or further from the source. Other devices, often designated gamma cameras or pinhole cameras, accurately locate a gamma source when pointed in the direction of the emissions, but these devices include quite heavy collimation and because of their limited field of view, and are of greatest value only after the threat is originally detected by devices such as those noted above.

Still other devices, known as Compton cameras, while capable of gamma ray azimuth detection, cannot meet the above requirements. Compton cameras work by measuring the track of scintillation resulting from interactions between the incident gamma rays and material in different sections of the detector. The radiation source azimuth can be calculated by backward extension of the track. This approach provides a line that will include the location of the source and provides sensitivity for weak gamma-ray sources compared to non-imaging systems. However, Compton cameras currently are laboratory devices too large and cumbersome for use as set forth above.

SUMMARY OF THE INVENTION

Embodiments of the present invention are directed to an apparatus and method for detecting and determining a source azimuth for gamma radiation from a selected set of one or more radioisotopes. The apparatus includes at least two scintillator detectors crystals having axes at a particular angular displacement to define a plane of detection; at least one signal being produced for each crystal; and a digital processing system configured to analyze spectral data from each electrical signal produced for each crystal. The digital processing system is further configured to monitor pulse counts within each of a finite number of spectral windows each corresponding to a range of energy levels of gamma rays. One or more of the electrical signals is used to determine a signal intensity and a likely source azimuth for at least one detected radioisotope in the plane of detection.

In one form, each of the scintillation crystals has a length to diameter ratio equal to or greater than about 2:1. In some embodiments, axes of the scintillation crystals are equiangularly disposed. In some embodiments, the scintillation crystals comprise cerium-doped lanthanum bromide. In some embodiments, it is preferred to use each scintillation crystal having a minimum resolution. One measure of a suitable resolution is a full width at half maximum (FWHM) energy resolution of less than 4% at 660 KeV to discriminate against scattered radiation. In some embodiments, each scintillation crystal comprises at least one end cap and at least one trim shield mounted parallel to the end cap to enhance anisotropic response by increasing variability at detection null points.

In one form, the apparatus includes a transmitter for transmitting to a remote device a representation of said detected signal intensity and said likely source azimuth.

In some embodiments, the apparatus includes at least one further scintillation crystal at angular offset to the other scintillation crystals and direction outside of the common plane of detection; and at least one further photodetector adjacent to the further scintillation crystal for converting the light response of the further scintillation crystal into a further electrical signal. In these embodiments, the digital processing system is further configured to use the further electrical signal and one or more of the electrical signals to determine a signal intensity and likely three-dimensional source azimuth for at least one detected radioisotope.

In some embodiments, the apparatus includes global positioning system (GPS) and compass sensors to enable tracking of the position and orientation of the apparatus. The signal intensity and three-dimensional source azimuth are used with the GPS data and compass sensor data to calculate specific source coordinates and strength in a known environment.

In some embodiments, the remote device is a hand-held remote readout comprising GPS and compass sensors, which, based on signals transmitted from the detecting apparatus, indicates source position relative to the readout and calculated gamma field intensity at the remote readout location. The hand-held remote readout stores a time stamp to estimate the timing of radiation detection and cumulative exposure of the remote readout operator.

The present specification is also directed to a method of detecting and determining a source azimuth for gamma radiation from a selected set of one or more radioisotopes. The method includes the steps of placing at least two scintillation crystals at angular offsets to each other; directing the scintillation crystals toward a common plane of detection; producing at least one electrical signal for each scintillation crystal at a corresponding photodetector adjacent to each scintillation crystal; analyzing spectral data from each electrical signal produced for each crystal at a finite number of energy levels, and calculating from one or more of the electrical signals a signal intensity and a likely source azimuth for at least one detected radioisotope in the plane of detection. A continuous range of energy levels may be divided into spectral windows of a selected resolution. Said radioisotopes will have particular signatures.

In some embodiments, the method includes the step of suppressing the calculation of the likely source azimuth for a given radioisotope unless an electrical signal within a spectral window corresponding to the given radioisotope exceeds a threshold.

In some embodiments, the calculating step includes determining a reference isotropic polar response from a combination of the electrical signals; and comparing each electrical signal to the reference isotropic polar response to determine the signal intensity and the likely source azimuth.

In some embodiments, the method includes the step of cyclically monitoring each spectral window, wherein each cyclical iteration comprises first measuring the intensity of the spectral window having the highest intensity, and then adjusting the detection threshold in each subsequent lower spectral window by an amount associated with the intensity measured in higher windows.

In some embodiments, the method includes the steps of determining a normalization value based on the expected effect of scatter from high energy sources, and subtracting the normalization value from each signal intensity calculation.

In some embodiments, the calculating step includes: comparing, for each photodetector, the electrical signal in a given spectral window to a stored history of signal measurements in the given spectral window to determine a signal intensity and a likely source azimuth.

In some embodiments, the method includes the steps of placing a further scintillation crystal at an angular offset to the other scintillation crystals; directing the further scintillation crystal outside of the common plane of detection; and producing a further electrical signal for the further scintillation crystal at a further corresponding photodetector adjacent to the further scintillation crystal. In these embodiments, the calculating step includes calculating from the further electrical signal and one or more of the electrical signals a signal intensity and likely three-dimensional source azimuth for at least one detected radioisotope. In some embodiments, this embodiment includes the steps of converting the signal intensity and likely three-dimensional source azimuth into likely three-dimensional source position data; transmitting the three-dimensional source position data to a video system; and overlaying, at the video system, the three-dimensional source position data. The video system overlays the three-dimensional source on a video image of an environment in which the method is performed.

In some embodiments, the analyzing step includes calibrating at least one of the scintillation crystals and corresponding photodetectors based on a temperature sensor reading from a temperature sensor monitoring the scintillation crystal.

In some embodiments, the method includes the step of identifying the detected radio isotope by its spectral distribution.

Generally, an isotope locating system is disclosed utilizing a gamma ray detection. Additionally, electrical signals produced in response to gamma ray detection may be used for isotope identification and improving resolution in isotope identification. In some embodiments, these are based on an ensemble comprising of two or more geometrically configured sensors, which may use of small trim shielding components. Together, the sensors may enable the simultaneous identification and determination of the azimuth of one or more gamma ray sources over a 360° field of view. The response of each sensor element may be anisotropic, providing a response dependent on the azimuth of the source relative to the sensor, while the integrated response of the ensemble is isotropic, providing a reference for azimuth determination and detector sensitivity. The optional use of extremely high energy resolution scintillation sensors enables determination of gamma photons directly from the source, and discrimination of these photos from scattered photons and background radiation without the losses associated with collimated shielding. An improved algorithm accounting for low level scintillator emissions may be used to improve the ability to provide the azimuth of the isotopes of interest over a wide range of environmental conditions. The system may be utilized in mobile search modes including robotic applications as well as fixed incident response modes.

In some embodiments, the detection system includes two assemblies, a detection assembly and a remote readout assembly. The detection assembly may comprise one or more ensembles of two or more individual elongated crystal sensor elements, each of which may be monitored individually and summed. The sensor with the minimal response would be the sensor pointing most nearly in the direction of a line from the source to the detection system. This technique is independent of source strength or distance, although weaker or more distant sources will have reduced statistical precision. Multiple isotopes would be individually identified and their azimuth determined in parallel.

The presently disclosed subject matter addresses the need for locating and identifying multiple gamma ray sources simultaneously without the expense and heavy collimation components required for such detector apparatus as pinhole cameras, and generally without cryogenic cooling or cumbersome collimation.

The presently disclosed subject matter enables the use scintillation crystals which may be used at room temperature for gamma and x-ray detection. This is in contrast to high purity germanium crystals which must be cooled to cryogenic temperatures. Gaseous ion chambers which can operate at room temperature do not have the density and thus the sensitivity of scintillators. The most important radiation measurement characteristics of merit for a scintillation crystal sensor applied to gamma source detection, identification and location are high density to provide sensitivity and high light yield to provide precise energy resolution for identifying photo peaks of specific radioisotopes. Other characteristics such as shock resistance, resistance to hydroscopic damage and temperature stability are also important to develop a useful field instrument for reliable operation outside of the laboratory.

BRIEF DESCRIPTION OF THE DRAWINGS

Embodiments of the invention are more particularly described with reference to the following drawings taken in connection with the following description.

DETAILED DESCRIPTION

Figure 1:
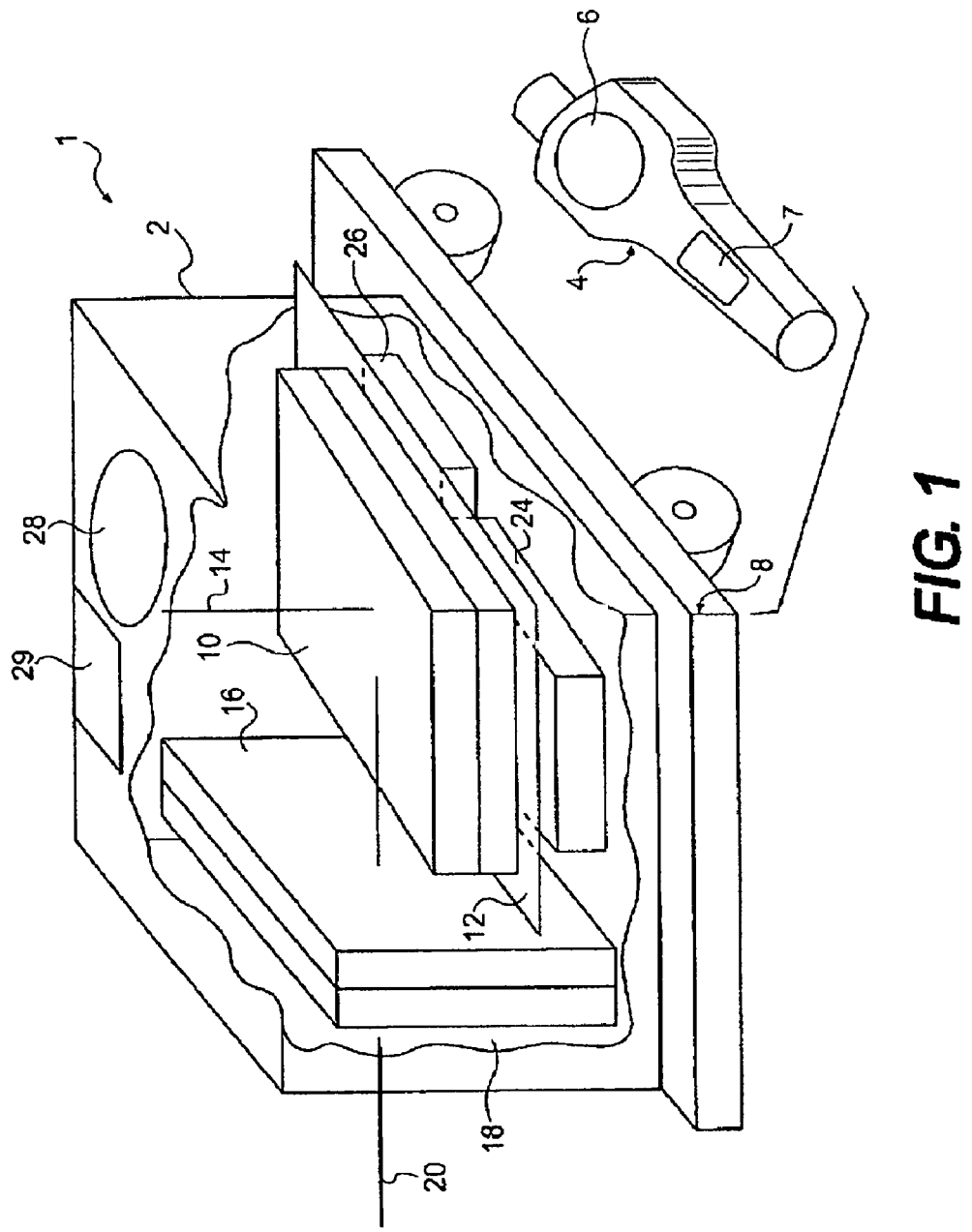
FIG. 1 is illustration, partly broken away, of a detector instrument constructed in accordance with an embodiment of the present invention.

FIG. 1 is a perspective illustration of a detector instrument 1 constructed in accordance with an embodiment of the present invention. In one form, the detector instrument 1 will detect azimuth of a gamma radiation source. In a further embodiment, both azimuth and elevation may be determined in order to provide a three dimensional representation of location of the gamma source. Additionally, as further described below, energy spectra signatures of sources may be resolved in order to identify one or more radiation sources. The detector instrument 1 may be self-contained in a housing 2. Optionally, the detector instrument 1 may further comprise a remote control unit 4. In the present illustration, the remote control unit 4 comprises a display 6 and a user interface 7. The user interface 7 may comprise switches and other control means. Commonly, the remote control unit 4 will communicate with the housing 2 by a radio frequency (RF) link. Other or additional forms of communication may be used.

Additionally, the housing 2 may be placed on a robotic vehicle 8. The robotic vehicle 8 may carry the detector instrument 1 into environments that would be inhospitable to an instrument operator. Such environments may include contaminated sites or combat areas. The robotic vehicle 8 may communicate with the remote control unit 4 and housing 2. The robotic vehicle 8 may interconnect with the detector instrument 1 to share intelligence and control functions. For example, both the detector instrument 1 and robotic vehicle 8 may make use of a common global positioning system (GPS) and in computer processing power.

The detector instrument 1 includes a first detector ensemble 10. The first detector ensemble 10 is utilized to provide directional information with respect to a source in a first degree of freedom 12. In one preferred form, directional information is provided as an azimuth, i.e. angular displacement with respect to a reference position about a first axis 14. A source of gamma radiation will have a projection on the plane 12 in a direction parallel to the first axis 14. In order to provide additional directional information, a second detector ensemble 16 may be provided for responding to position of a source within a second degree of freedom 18, represented as a plane. In one form, the information may be presented as an elevation, i.e., an angular position with respect to a reference position about an axis 20 normal to the plane 18. In the present illustration, the detector instrument 1 is disposed so that the first and second axes 14 and 20 are respectively vertical and horizontal. Other dispositions may be provided. In employing common direction measuring systems, it is desirable to define axes 14 and 20 that are orthogonal. However, other direction finding conventions exist.

The detector instrument 1 comprises control and processing circuit 24 which may be powered by a power circuit 26. In a preferred form, the processing and control circuit 24 is coupled to process input information and from each detector ensemble 10 and 16 which may be included in the apparatus. Additionally, the processing and control circuit 24 preferably provides output information to a display 28. The display 28 may include a plurality of display elements each providing separate information. Display information may include text information indicative of source identity, numerical information indicative of signal intensities and other information. The processing control circuit may also further interact with a user interface 29. The user interface 29 may include switches, command means and data input means if desired. Additionally, the processing and control circuit 24 may interface with the robotic vehicle 8. The processing and control circuit 24 may further comprise an RF link for communicating with the remote control unit 4.

Figure 2:
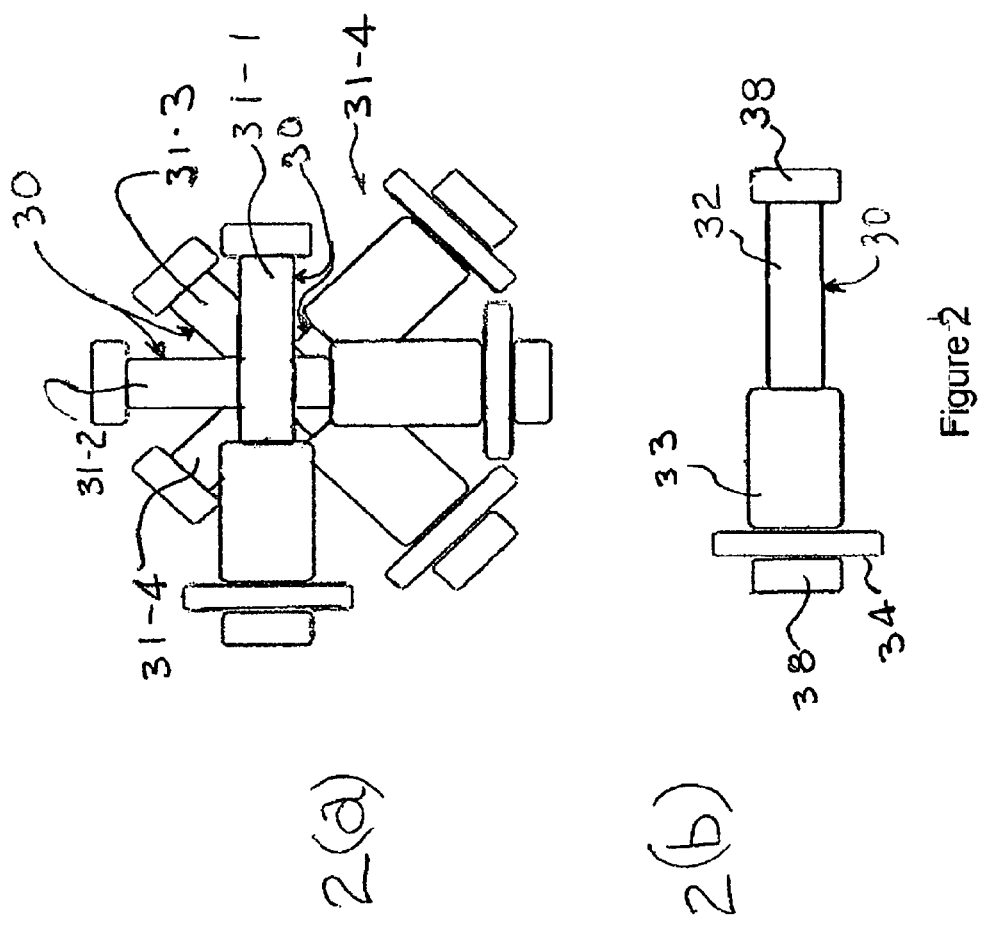
FIG. 2 is a plan view of a detector ensemble.

FIG. 2 consists of FIGS. 2a and 2b. FIG. 2a is a plan view of the detector ensemble 10, and FIG. 2b is a plan view form of scintillation detector with its housing removed. The detector ensemble 16 may have the same construction and, therefore, is also illustrated by FIG. 2. The detector ensemble includes a plurality of cylindrical housings 30 each containing a scintillation sensor 31. In the present illustration, four scintillation sensors 31, denoted 31-1 through 31-4, are provided. The sensor 31-1 is partially broken away to illustrate components of one common form of scintillation sensor. The scintillation sensor 31-1 comprises a scintillation crystal 32 optically coupled to a photodetector 33. In a preferred form, a signaling conditioning circuit 34 is provided so that a relatively strong output from a scintillation sensor 31 may be provided to the processing and control circuit 24 rather than a raw signal. In this manner, signal-to-noise ratio is maximized. Additionally, the signal conditioning circuit 34 will include an analog to digital converter in order to provide digital signals for processing.

In the current state-of-the-art, scintillation detectors include light detectors coupled to scintillation crystals. When a gamma ray traverses the scintillation crystal 32, light is produced. The light must be sensed in order to provide an output pulse from the scintillation sensor 31. As further seen below with respect to FIG. 3, and the present embodiment, the photodetector 33 comprises a photomultiplier tube. Other forms of light detectors may be used with scintillation crystals. Read-outs of the impinging radiation may then be individually and cumulatively recorded by a computer (FIG. 3), or any other recording device.

Many forms of scintillation crystals may be utilized. Many different parameters may be optimized. These parameters include expense, density, and thus sensitivity, physical strength and resolution. In one significant application, it is preferred to use the detector instrument to find such dangerous gamma emitters as cobalt and cesium. Necessary resolution for a crystal can be determined in terms of whether and desirable results can be achieved in detection of isotopes of interest. One measure of a suitable resolution directly related to the light yield of the Scintillator is a full width at half maximum (FWHM) energy resolution at a reference level of 660 KeV. It has been found in accordance with an embodiment of the present invention that one preferred resolution for detection of isotopes of wide interest is an FWHM of less than 4% at 660 KeV. Scintillation crystals are available in a number of materials.

One suitable high energy resolution scintillation crystal is cerium-doped lanthanum bromide, $LaBr_3$:Ce, available from Saint-Gobain Crystals, Solon, Ohio and Nemours, France. LaBr3 has a relative density of 5.29 and a light output of 63 photons/keV. LaBr3:Ce crystals demonstrate high sensitivity and high resolution. They detect gamma radiation at room temperature. Cryogenic cooling apparatus is not needed. LaBr3:Ce crystals are resistant to thermal and mechanical shock and to degradation due to moisture. In an illustrative embodiment, $LaBr_3$:Ce crystals having a specific gravity of 5.6 were utilized. The $LaBr_3$:Ce crystals had an energy resolution of 3% at 662 KeV.

The scintillation crystal 32 according to one embodiment of the present invention is elongated. The scintillation crystal 32 is elongated with respect to conventional scintillation crystal designs. Prior art conventional scintillators attempt to balance geometries for more efficient light collection and packaging. Embodiments of the present invention provide for a large L:D ratio, where L=length and D=diameter to improve the directionality of response to radiation source. "Large" in the present context may mean at least about 2:1. A preferred L:R ratio is approximately 4:1. It is important to optimize improvement in directionality against cost and practicality in crystal manufacture. Too long a length can result in significant light collection variation. Also, thickness, or diameter, may be selected by optimizing the amount of radiation received by a crystal versus size and cost of the crystal. In an illustrative embodiment, a crystal having a 1" diameter, with D=1" and L=4" was suitable.

Directionality may be further improved through the use of shielding. In the present embodiments, annular directional shields 38 are provided at opposite axial ends of each cylindrical housings 30. Although limited in axial length, the directional shields 38 reduce response to radiation at the ends of each cylinder. A suitable material for the directional shields 38 is tungsten. Lead could be used in the alternative, but provides additional weight. The arrangement of the present embodiment provides for a highly successful optimization of directionality of each scintillation detector 31 versus weight. Prior art gamma detectors have used large amounts of lead in order to provide sufficient shielding to assure directionality. The lighter weight of the present embodiment increases ease of use with respect to a robotic vehicle 8 or with respect airborne applications.

Figure 3:
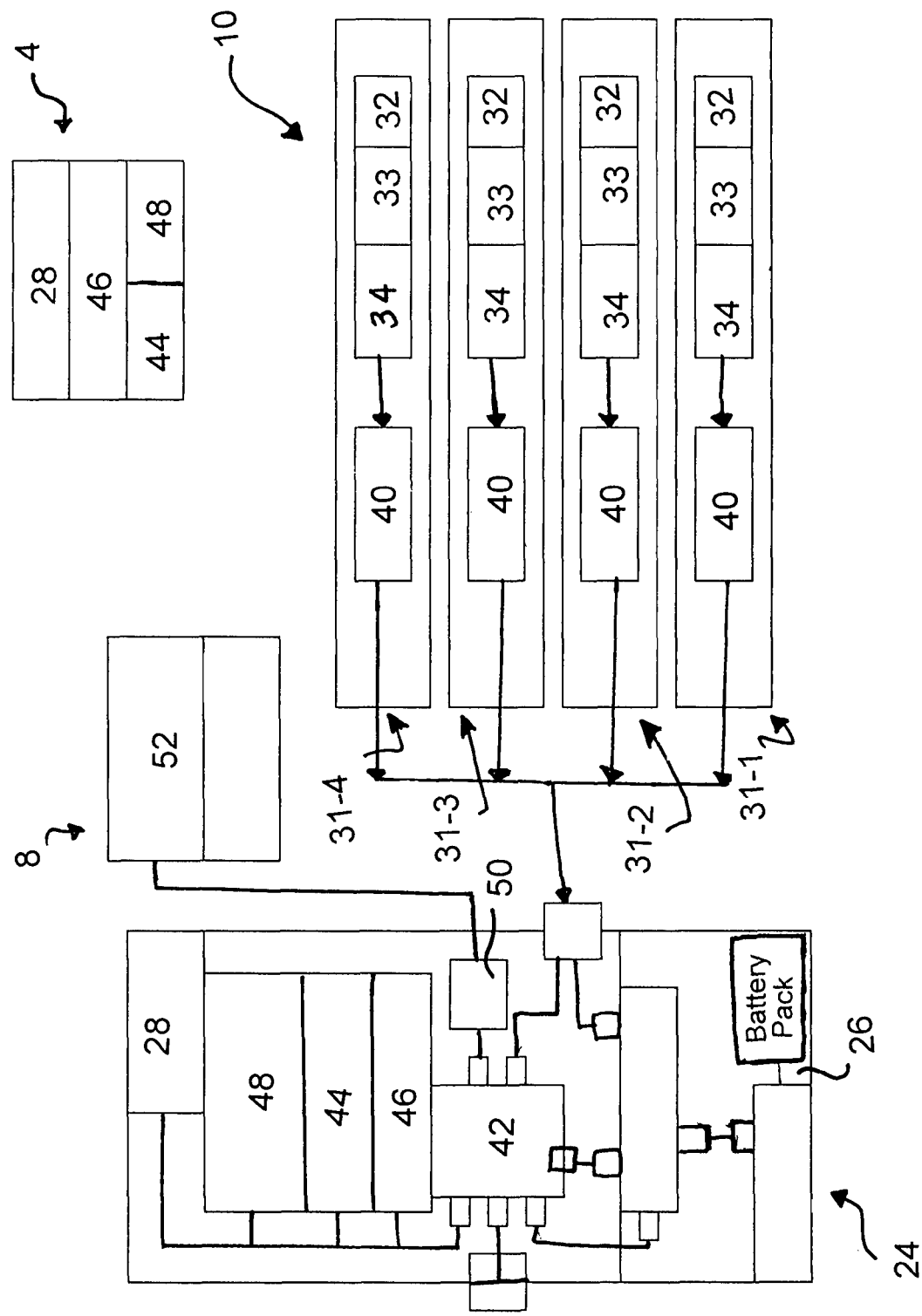
FIG. 3 is a block diagram of one form of the detector instrument of FIG. 1.

FIG. 3 is a block diagram of one form of the detector instrument 1. For simplicity in illustration, an embodiment is illustrated in which the first detector ensemble 10 is included. A second detector ensemble 16 may be interfaced to the processing and control circuit 24 in the same manner as the first detector ensemble 10. In the present illustration, both signal shaping circuitry and spectral counting and discrimination circuitry are included in the detector ensemble 10. Alternatively, signal shaping circuitry and spectral counting and discrimination circuitry may be included in the processing and control circuit 24. The scintillation sensor 31-1 is representative of each of the scintillation sensors. The scintillation crystal 32 is coupled to a photodetector 33, which in the present embodiment comprises a photomultiplier tube (PMT). The signal conditioning circuit 34 comprises a preamplifier and a bipolar shaper. The output of each of the signal conditioning circuits 34 is provided to a multichannel analyzer 40. In alternative embodiments, the multichannel analyzer 40 may be located in the processing and control circuit 24.

The multichannel analyzer 40 collects gamma ray counts. A range of expected energies of detected pulses is resolved into a preselected number of channels, or windows. The multichannel analyzer provides separate counts for pulses detected having an energy level corresponding to respective windows. The multichannel analyzer output is plotted, as further described below in terms of number of counts versus respective energy levels. Particular isotopes of interest will produce peaks of counts having selected magnitudes at selected energy levels. This set of peaks comprises a signature by which an isotope may be identified.

In the present illustration, the processing and control circuit 24 comprises an onboard computer 42. One suitable implementation of the onboard computer 42 is as a PC/104 circuit board. PC/104 standards are published by the PC/104 Consortium, San Francisco, Calif. The onboard computer can perform all of the analysis for isotope detection, identification, and azimuth determination for each isotope. The power circuit 26 preferably comprises both an interface to the external alternating current power supply and a battery pack. Power conditioning circuitry is also provided to meet the needs of the onboard computer 42. Also interacting with the onboard computer 42 are a GPS unit 44, RF communications module 46, and a compass 48 providing an electronic output indicative of disposition of the detector instrument 1. The RF communications module 46 communicates with the remote control unit 4. The onboard computer 42 is also coupled to the display 28. The robotic vehicle 8 comprises a robotic vehicle command module 52 which communicates with the onboard computer 42 via a robotic vehicle interface 50.

Figure 4:
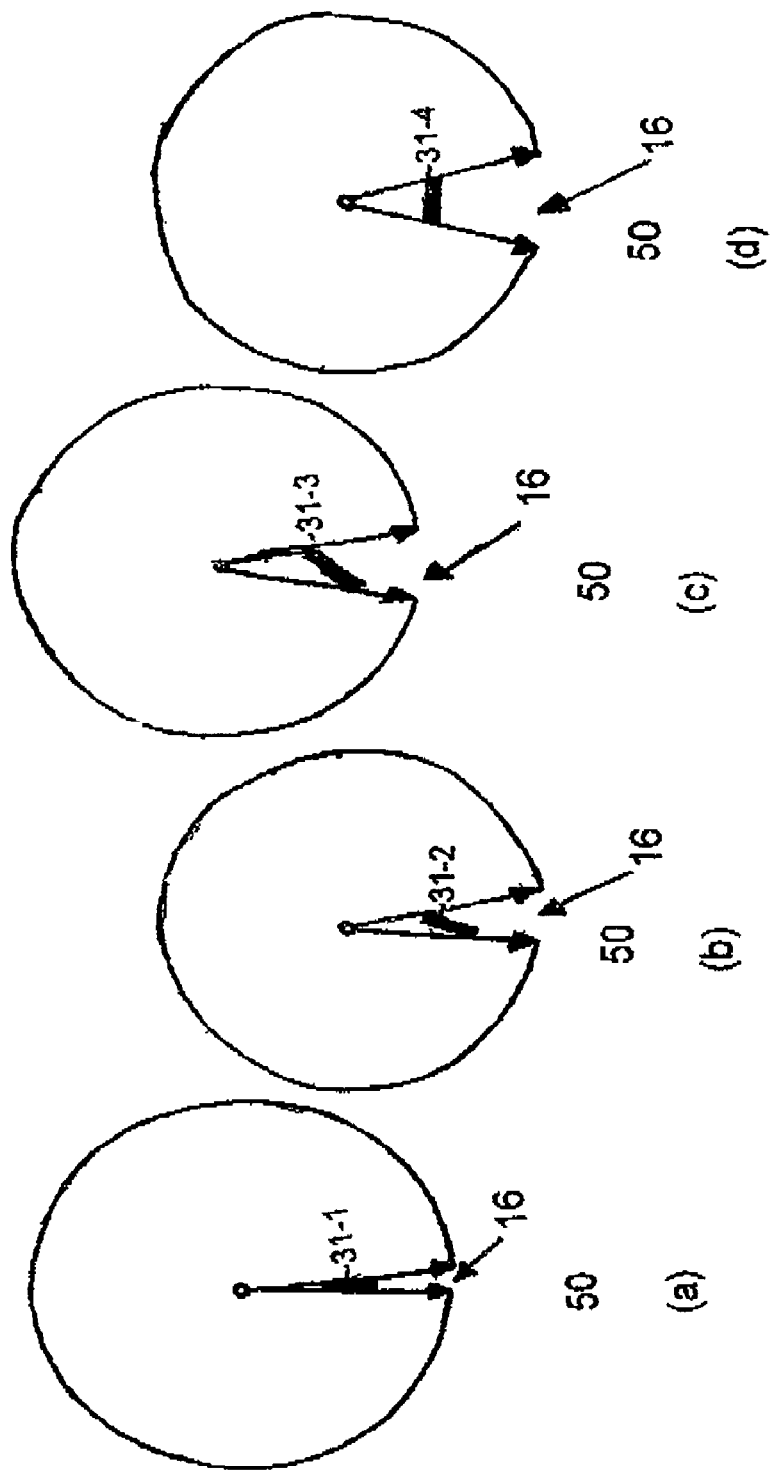
FIG. 4 is an illustration of the exposure of scintillation crystals angularly displaced from one another in a manner similar to that of FIG. 2 to radiation emanating from a reference direction.

FIG. 4, consisting of FIGS. 4a-4d, is an illustration of the exposure of scintillation crystals 32 angularly displaced from one another in a manner similar to that of FIG. 2 to radiation emanating from a reference direction. Each scintillation crystal 32 absorbs progressively more radiation from an emanating source in a plane as it is rotated towards a perpendicular position relative to a source. It is important to discriminate against scattered radiation.

Figure 5:
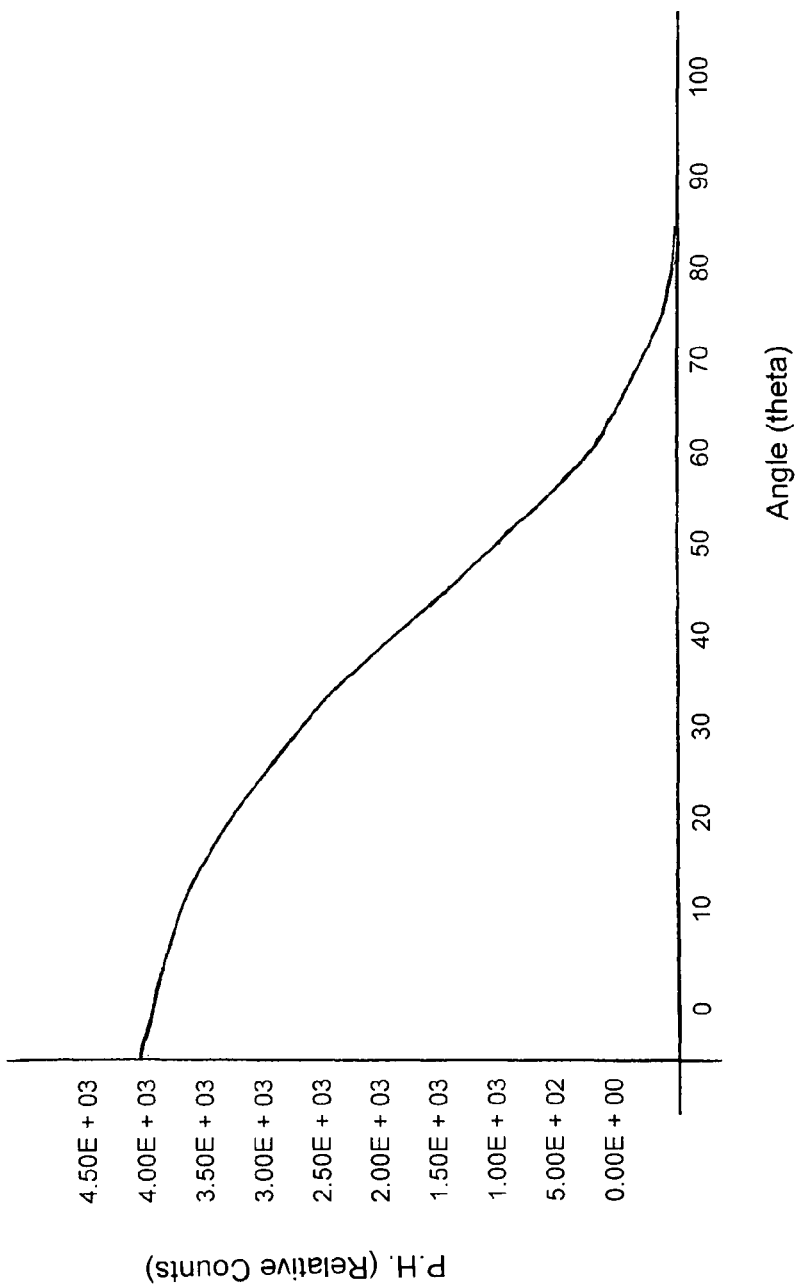
FIG. 5 is a plot of count level versus angular displacement of a directionally shielded scintillator to a reference radiation source.

FIG. 5 is a plot of count level versus angular displacement of a directionally shielded scintillator to a reference radiation source. More specifically, FIG. 5 illustrates a Monte Carlo N-Particle transport code (MCNP) projection of the scintillation responses of a 1" diameter by 4" length cylindrical LaBr3:Ce crystal exposed to a 660 KeV localized source at 10 meters producing $10^8$ photons (equivalent to 1 second exposure from a 2.7 milliCurie Cs-137 source). A scintillation detector 31 is used in which the directional shields 38 each have an axial length of 1".

Precision of directionality was calculated by MCNP modeling of the scintillation responses of a 1" diameter by 4" length cylindrical LaBr3:Ce crystal exposed to point sources with photon energy ranging from 80 KeV to 1.3 MeV. A response variation of approximately 1% per degree within a range of ±45° from the cylinder axis is obtained. The variation is predicted to decrease as a point perpendicular to the cylinder axis is approached. This response variation with angle is sufficient to produce a 10° (±5°) angular resolution at 1 standard deviation with 5% statistics (400 Gaussian events).

Figure 6:
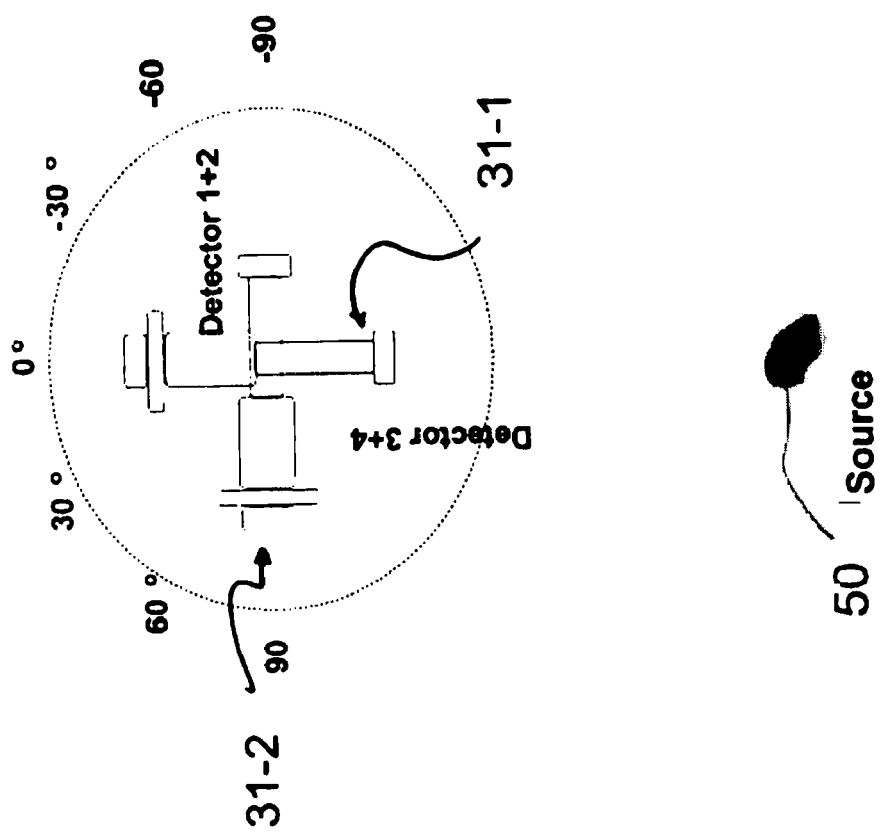
FIG. 6 is a plan view of one form of detector ensemble in which four scintillation detectors are each disposed orthogonally with respect to an adjacent detector and in which one detector is directed at a gamma radiation source.
Figure 7:
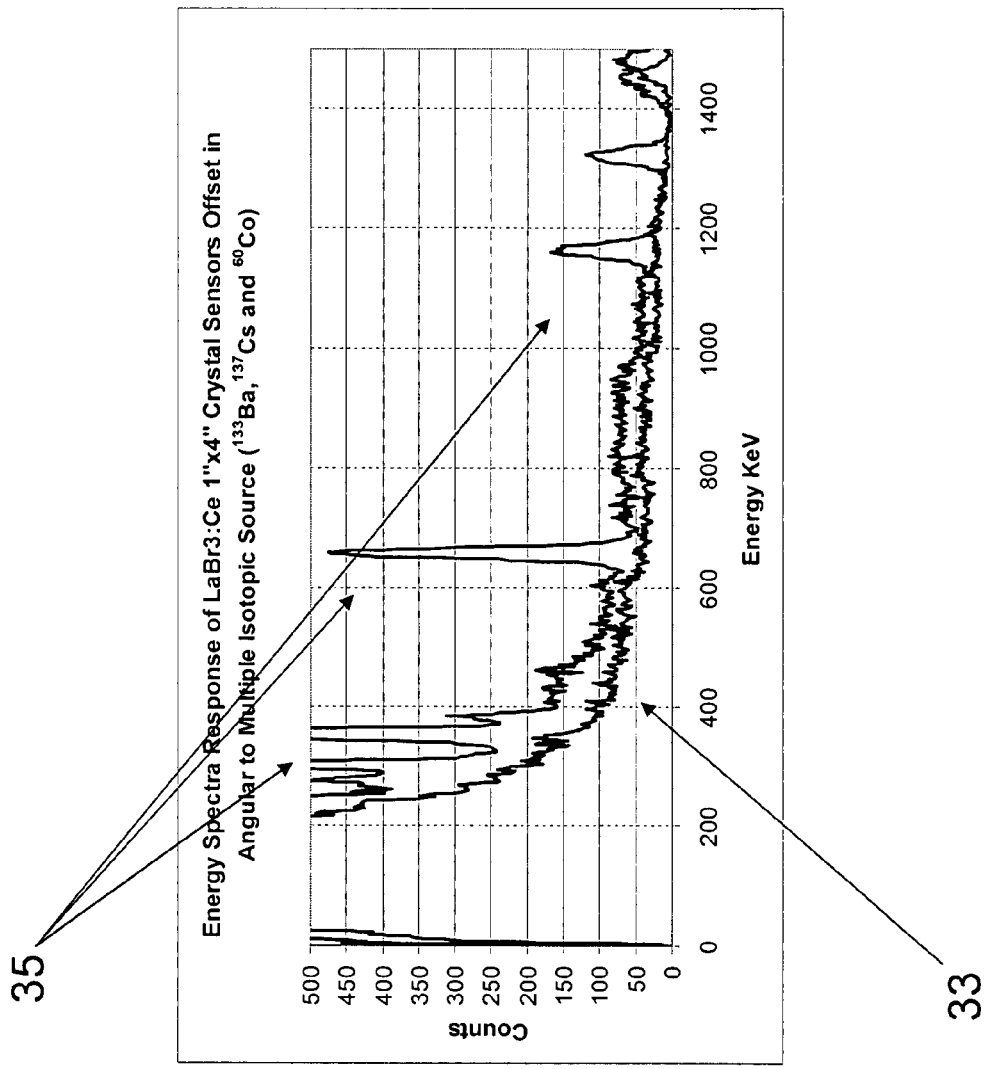
FIG. 7 is an energy spectrum plot of the respective responses of orthogonally disposed scintillation detectors.

FIG. 6 is a plan view of one form of detector ensemble in which two scintillation detectors 31-1 and 31-2 are each disposed orthogonally with respect to the adjacent detector and in which one detector is directed at a gamma radiation source. FIG. 7 is an energy spectrum plot of the respective responses of orthogonally disposed scintillation detectors. In this illustration, scintillation detector 31-1 through 31-2 each comprise a LaBr$_3$:Ce 1" diameter by 4" long crystals perpendicular. Scintillation detectors 31-1 is aligned such that a localized isotopic source 50 is located on its axis. Scintillation detectors 31-2 is aligned on an axis orthogonal to that of scintillation detector 31-1. The localized isotopic source 50 includes Ba-133, Cs-137 and Co-60. As seen in FIG. 7, the spectra 33 for the sensor 31-1 with its cylindrical axis pointed at the source 50 shows no response other than background. The spectra 35 for the sensor 31-2 with its cylindrical axis at right angles to the source 50 shows abundant response to each of the lines for each isotope and with high resolution enabling discrimination from scattered radiation or radiation from other sources. The difference in responses, especially when more than two detectors are used, may be used to determine the azimuth of the source.

Figure 8:
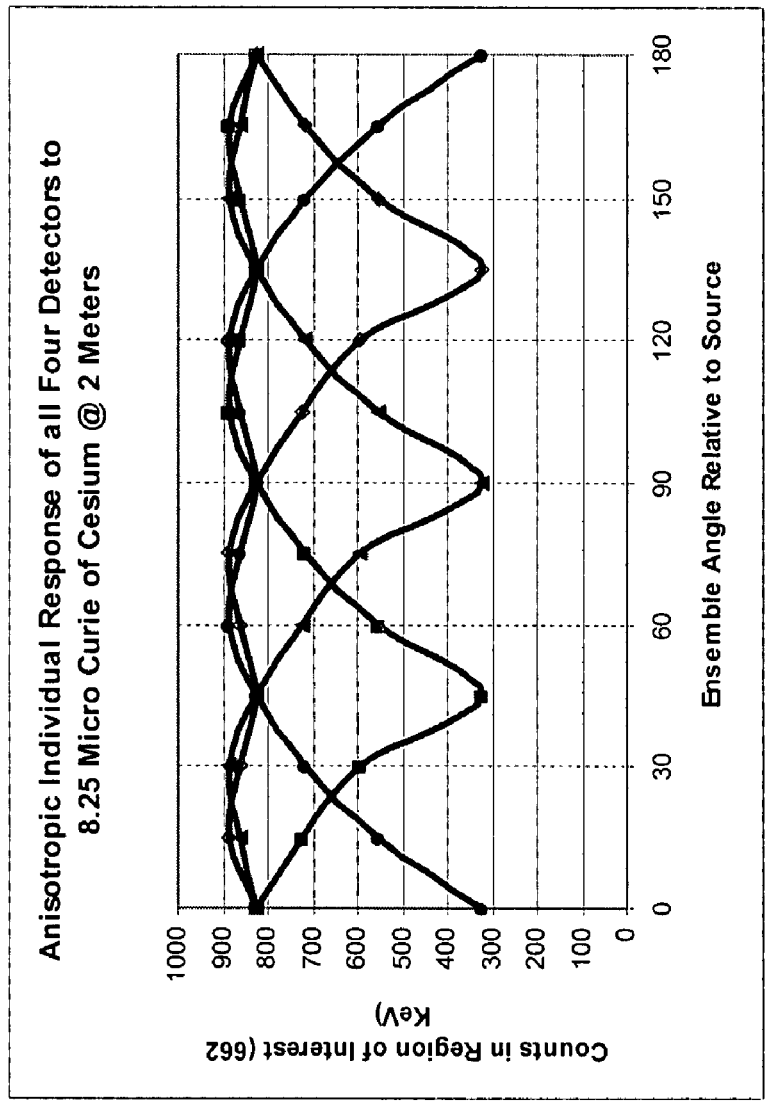
FIGS. 8 and 9 are respectively a Cartesian plot of the individual detectors and a polar plot of the cumulative response of the all detectors combined within the detector ensemble of FIG. 6.
Figure 9:
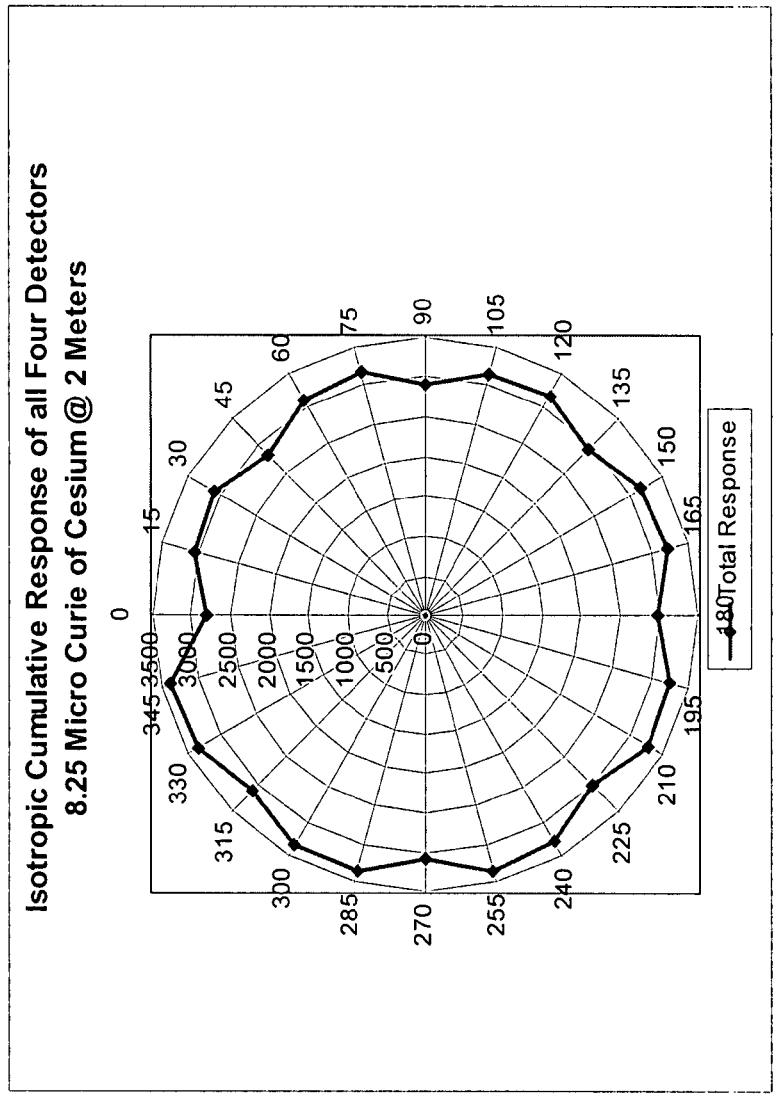

FIGS. 8 and 9 are respectively a Cartesian plot and a polar plot of the response of the scintillation detectors 31 in the detector ensemble of FIG. 6. FIG. 8 projects the response from an array of four (4) 1" diameter by 4" diameter LaBr$_3$:Ce sensors to a source varying from 0° to 180° that was obtained by using the measured response of a single sensor over 0° to 180°. The individual sensor responses demonstrate the differentiation of each sensor for a given source azimuth with a distinguishing minimum at the angle where the sensor cylinder is pointed at the source and a monotonic increase over ±45° in either direction from the cylinder axis. In FIG. 9, a cumulative response of individual detectors added together is illustrated as a cumulative sum shown as a bold line. The polar plot shows the consistency of the cumulative response which will enable an accurate reference for source intensity determination, and may be used to determine a measurement baseline or calibration value.

Figure 10:
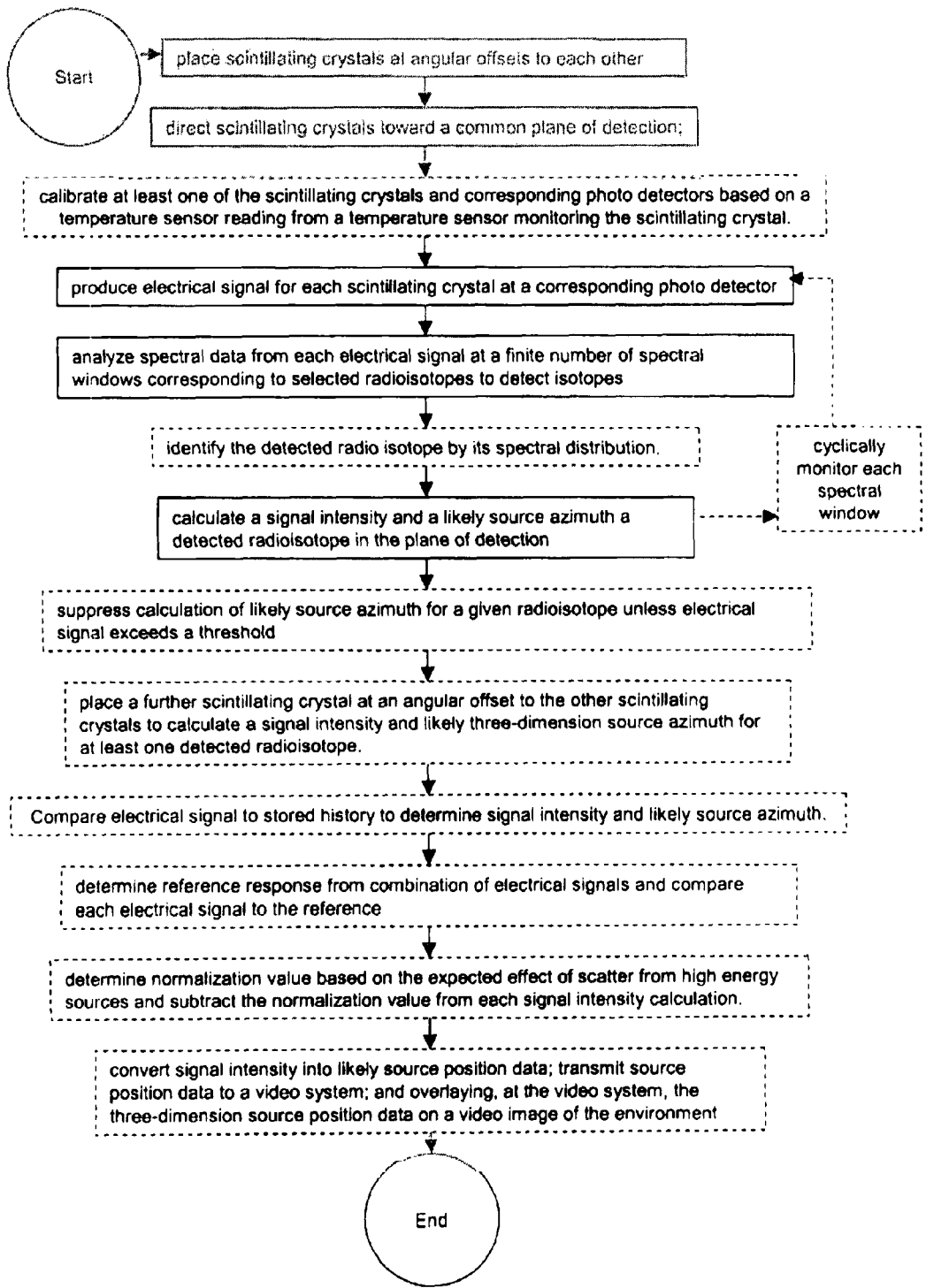
FIG. 10 is a flowchart illustrating a method according to an embodiment of the present invention.

FIG. 10 is a flowchart illustrating a method according to an embodiment of the present invention. This is merely one enabling example, and other techniques may be used according to the disclosed methods, and with the disclosed apparatus.

1. Place the count measurement for each sensor into a two dimensional matrix that includes a bin for the counts for each energy related channel associated with each sensor. The initial dimensions of this matrix will be N×C, where N=number of sensors and C=number of energy related channels.
2. Add the counts for each sensor from each channel into a cumulative storage location that is similar in structure to the storage for each individual sensor, but includes the total counts from all sensors. The resulting matrix dimensions will be (N+1)×C, where N=number of sensors and C=number of energy related channels and the additional data is for the cumulative data. This approach provides the maximum sensitivity since all sensors are contributing to the detection process.
3. Analysis of the cumulative data will then determine if any of the isotopes of interest are detected. To improve the speed of detection, and to minimize the detection of ambient or unimportant radiation, only those isotopes previously identified as being of interest will be analyzed. As a non-limiting example, this could nominally include all of the isotopes listed in Section 8.1 of Standard ANSI N42.34-2003, *Performance Criteria for Hand-held Instruments for the Detection and Identification of Radionuclides*, published by the American National Standards Institute Washington, D.C., or a chosen subset thereof. Any of the standard isotope identification algorithms such as region summing, peak fitting, least squares analysis of library spectra or other spectral analysis software can be used to yield a count indicator related to the strength for any detected isotope. At this point the presence and intensity of isotopes of interest can be reported without azimuth information. In addition, an azimuth determination algorithm may be processed in series for each isotope in any order, including optionally order of priority. As a non-limiting example, the highest priority may be given to special nuclear and suspicious materials. The azimuth determination of medical and industrial isotopes may be given the next highest priority and naturally occurring radioactive materials (NORM) may be analyzed last.
4. For each isotope detected the cumulative $Y_C$ by addition of the individual sensor yields $Y_I$:

$Y_C = \Sigma Y_I$ for I=1, N where N is the number of sensors

The ratio of each individual sensor is calculated as:

$R_I = Y_I/Y_C$ for I=1, N where N is the number of sensors

The sensor with the minimum ratio for an identified isotope is determined as the selected sensor with its axis pointing most closely to the gamma source and localizing the azimuth to ±90°/N. For N=4 the azimuth is localized to ±22.5°. If two sensors have the same minimum ratio, the azimuth is determined at the median point between the axes of the cylindrical axes of these two sensors, and no further calculation is required. If only a single selected sensor has the minimum, the ratios of the responses of the adjacent sensors are compared. The adjacent sensor with the minimal ratio determines the direction from the null of the selected sensor of the source azimuth and further localizes the azimuth to ±45°/N. For N=4 the azimuth is localized to ±11.25°.
5. The precise azimuth may be further resolved by extrapolating from a table of azimuth versus response ratios for each isotope that is populated by a calibration process. The sensor with the second minimal ratio provides a check and second order correction to the extrapolation. If more than one spectral channel is identified for the detected isotope this process will be repeated for the additional isotopes and a simple averaging of results will indicate the azimuth.

It should be noted that scintillation crystals sometimes produce low-level emanations which may be accounted for. In particular, LaBr3:Ce produces a natural low-level radiation emanation at 1.41 MeV due to the presence of naturally occurring La-138. This emanation does not interfere directly with the major sources of interest, but does provide a running indication of the system health for each channel.

Although usable with a wide variety of crystals, the presently disclosed approach for detecting the azimuth of selected gamma emitting radioisotopes exploits recent developments in scintillation crystal performance and will further improve as more advanced crystals emerge. To gain benefits in sensitivity, rapid response and stand-off distance, an embodiment of the present disclosure describes a practical device that will locate the isotopes of interest for security and other purposes with a modest but useful degree of angular resolution (±5°, as demonstrated in the laboratory) without expensive or exotic detectors, extensive collimation and shielding, or use of cryogenically cooled detectors. However, this is only one embodiment, and the present disclosure and claims recite various other embodiments for the disclosed apparatus and methods.

In some embodiments, the invention may operate in two modes: 1) a routine search mode which aggregates spectra from the large volume of the entire ensemble for enhanced sensitivity during a search for sources of interest while eliminating responses from background or scatter at different energies and 2) a locate mode which determines which sensors are having null or reduced signals at the energy level of the detected source of interest.

The present configuration is highly desirable in that the detectors are combined in an ensemble providing directional information for the overall system to determine location of the radiation source. A set of these log-shaped sensors may be deployed, each having an axis rotated from the others so that each sees a differing capture efficiency to gamma rays coming from localized sources. An end of each scintillation detector may be formed to block radiation so that the scintillation detector shows no sensitivity when viewed directly on end. As the angle between a detector axis and the direction of incident radiation is changed, we see a counting rate that to zeroth order is proportional to the projected area of the exposed side comprising the length of a crystal in the detector. Typically this is of the form $A\sin(\phi)$, where A is the geometric area of a side and $\phi$ is the angle from the long axis. Since each sensor is oriented at a differing incremental angle, each sees a differing efficiency to the same flux dependent on its individual incoming angle. If we take the normalized spectrum from all sensors, we have a sensitive measure of the total flux and the energy spectrum present. By then analyzing the relative flux from each detector, we can determine the effective source angle.

One might be concerned that this effect would be highly energy dependent. The situation for three typical energies, 330 KeV, 660 KeV and 1000 KeV have been considered and in each case modeled the detector efficiency considering the effective path length and the end effects as the beam strikes further from the incoming shield. This efficiency can be expressed for a rectangular sensor of area A having a width, W and length, L, as Formula 1:

$$\varepsilon \approx \frac{w}{A} \int_0^L dl \exp(-\mu(E)X(l)) \quad (1)$$

Where X(I) is the effective path length in the sensor as a function of position along the length and $\mu(E)$ is the linear absorption coefficient for any given energy.

Embodiments of the invention integrate two or more radiation detector sets into an array with an angular offset. By summing the output from each detector in the array, the overall strength of the source is provided, preferably for each energy spectrum window. The detector responses can be stabilized and calibrated relative to each other to ensure that appropriate windows are summed, by either an onboard check source or an intrinsic background source in the detectors. The output for each detector for each window may be compared to the sum to develop a ratio for each detector. Correlating this ratio to determine location is a straightforward lookup and interpolation process as discussed above.

Another enabling technical element of the invention is to take advantage of the excellent energy resolution and sensitivity of recently available room temperature crystals such as lanthanum bromide, LaBr3, to quickly identify the source isotopes. Their use significantly speeds analysis while making identification possible from shielded sources and/or in a scatter environment that would mask current instruments. The LaBr3 detectors use the near ideal properties of cerium doping to efficiently shift the emitted light into the visible providing high energy resolution of <3% with improved sensitivity. The sensitivity and resolution of scintillators enables the invention to be implemented without the need for a complex array or precise timing measurement as required for potential semiconductor arrays to measure directionality.

Embodiments of the present invention make use of a property of LaBr3 that has been referred to in prior art publications as "contamination." LaBr3 includes the naturally isotope La-138, which is a gamma ray emitter. La-138 has a weak isotopic peak. In one embodiment, a channel is dedicated to detecting La-138 radiation. Responses to La-138 of each crystal are normalized and compared. Performance of the crystals is monitored. Compensation can be provided as needed to maintain system stability.

Generally the characteristic peaks in a gamma spectrum are superimposed on a sharply varying continuum of scattered radiation making it difficult to observe the smaller peaks within the spectrum. In fact, in the case of highly shielded sources, the radiation emitted from the shield may well have more scattered than direct component. In such situations, closely spaced peaks are often filled in, making identification difficult with standard identification algorithms. Embodiments of the present invention may use a zero sum, variable width kernel developed for convolution of the spectral data before analysis. A range of energy levels is divided into a plurality of windows. Each window is continually monitored. The instrument accumulates counts within each window. In a processing cycle, counts for highest level windows are processed first. The amount of background for each energy window will be calculated and subtracted from the other windows. These techniques allow for the compensation of peak signatures to remove artifacts due to radiation from sources other than a particular isotope of interest.

One form of calculation of background radiation is performed by collecting spectral data for particular analyzed isotopes and comparing the radiation measured to a control level. For example, the system may measure the radiation produced by both cobalt and cesium and then compare measured radiation to that produced by cobalt alone. The effect of cobalt on measured cesium levels is determined. A look up table may be generated so that the instrument can readily adapt to compensate in selected environments.

The energy signal from each sensor is passed through multiplexers to a single ADC. Each scintillation crystal's spectrum is stored in a separate portion of the multi-channel analyzer's memory. A correction curve with adjustable offset and gain is calculated for each sensor element and also stored in the computer. Data from all channels is then combined in the computer using the individual corrections to form a composite spectrum with much higher sensitivity. The corrected sum spectrum is used to identify isotopes and then the ratios of the individual sensors are calculated to estimate the most likely angle of incidence to the reference zero angle of the system. Experimental spectra have been successfully collected at rates up to 1 million events per second. Because of the high signal output of LaBr3, very little PMT gain, i.e., gain in the nature of that provided by a photomultiplier tube, is required. The system is optimized for maximum resolution and stability. Data from each detector can be stored as 1024 channel spectra, which provides ample resolution to separate all of the pre-determined critical peaks.

Combining isotope identification and spatial location data in a single embodiment provides a powerful tool for reducing the time required to locate a radiation source in a field environment. Approximately a dozen benign radiation alerts occur at ports of entry daily and each must be located and classified. Rapid location of the source minimizes the time to resolve the nature of benign industrial or medical radioisotope sources speeding their processing and avoiding confusion that may allow a hazardous source to pass. Rapid location of specific isotopes also minimizes the potential for false positive alarms caused by background which increases the confusion during inspection. The ability to simultaneously locate multiple sources prevents a hazardous source from being masked by a benign source.

It should be noted that multiple sources of the exact same isotope may provide ambiguous data that can be identified as a multiple-source presence, where location cannot be precisely defined. In this state other isotopes will continue to be located by the invention, since the processing for each isotope is isolated within the analysis routines. Additionally the base configuration of the invention only indicates the vector along which the radiation source lies, allowing for two possible locations 180° apart. Providing shielding to one end cap of the detectors would enable specific identification, but limit the coverage to 180°. Alternatively two such arrays could be back facing to provide 360° coverage.

Implementation of this innovation will provide numerous performance benefits including enhanced mobility, with low power and weight allowing the technology to be cart or vehicle-mounted and reduced dimensions enabling the invention to be scaled for precision and 2-D or 3-D location. Additionally heavy collimators and external, cumbersome cooling can be avoided providing additional packaging and deployment opportunities. Another important benefit is that scatter effects may be minimized by self-correcting software.

Further advantages over other systems in use such as coded aperture shielding or Compton scatter-based gamma cameras include that the disclosed system is able to minimize shielding providing maximum sensitivity for stand-off detection over a broad field of view (essentially 360°) coverage. Additionally the invention enables identification of threats in an environment containing significant naturally occurring radioactive material (NORM) and legitimate medical and industrial sources which could camouflage a dangerous source. The disclosed geometry provides a highly anisotropic response which is sensitive to the position of the isotopic source being observed. Employing these position sensitive sensors in a parallel plane ensemble and measuring the cumulative response from all detectors conveys a uniform isotropic response indicating the relative intensity of the source. This approach makes a highly sensitive broad coverage for remote source detection and identification available, while permitting comparison of the ratio of individual sensor response to the cumulative sum for azimuth determination. Additionally the high-energy resolution detectors discriminate against scattered radiation which could mask the direction of the hazard.

The system may operate passively (i.e., it simply detects radiation that is emitted from surrounding sources and that impacts on the detector rather than actively directing radiation to stimulate emission). However, active detection may also be used according to the present disclosure. The entire detection system can be contained in an enclosure that would easily fit within the storage area of a passenger vehicle or be transported aboard a ship or aircraft facilitating search modes and enables rapid transport to a crisis scene.

The previous description of some aspects is provided to enable any person skilled in the art to make or use the present invention. Various modifications to these aspects will be readily apparent to those skilled in the art, and the generic principles defined herein may be applied to other aspects without departing from the spirit or scope of the invention. For example, one or more elements can be rearranged and/or combined, or additional elements may be added. Thus, the present invention is not intended to be limited to the aspects shown herein but is to be accorded the widest scope consistent with the principles and novel features disclosed herein.

What is claimed is:

1. An apparatus for detecting and determining a source azimuth for gamma radiation from a radiation source comprising a set of one or more radioisotopes, the apparatus comprising: a first scintillator detector ensemble comprising at least two scintillation detectors each producing a distinct electrical signal and each comprising a scintillator crystal having a response varying with angular disposition with respect to a source, said crystals being disposed at angular offsets with respect to a reference axis and having an output and a processing and control circuit including a digital processing system configured to analyze spectral data from each electrical signal produced for each crystal, and a processing circuit to evaluate the electrical signals to determine a signal intensity and a likely source azimuth for at least one detected radioisotope in the plane of detection wherein the processing and control circuit is further configured to monitor a finite number of spectral windows corresponding to said set of one or more radioisotopes and compare detected energy spectra to stored signatures.

2. The apparatus of claim 1, further comprising a remote device and a transmitter for transmitting to the remote device a representation of said detected signal intensity and said likely source azimuth and wherein the remote device is a hand-held remote readout, wherein the hand-held remote readout comprises GPS and compass sensors, wherein the hand-held remote readout indicates source position relative to the readout and calculated gamma field intensity at the remote readout location, and wherein the hand-held remote readout storing a time stamp to estimate the timing of radiation detection and cumulative exposure of the remote readout operator.

3. A method of detecting and determining a source azimuth for gamma radiation from a selected set of one or more radioisotopes. the method comprising: providing at least two scintillation detectors each comprising a scintillator crystal having a response varying with angular disposition with respect to a source, placing the at least two scintillation detectors at angular offsets to each other with respect to a common axis; producing at least one electrical signal for each scintillation detector in response to detected radiation; analyzing spectral data from each electrical signal produced for each crystal at a finite number of spectral windows corresponding to said selected set of radioisotopes; and calculating from one or more of the electrical signals a signal intensity and selectively calculating in accordance with a signal level a likely source azimuth with respect to the reference axis for at least one detected radioisotope, the method further comprising: suppressing the calculation of the likely source azimuth for a given radioisotope unless an electrical signal within a spectral window corresponding to the given radioisotope exceeds a threshold.

4. The method of claim 3, wherein the calculating step comprises: determining a reference isotropic polar response from a combination of the electrical signals; and comparing each electrical signal to the reference isotropic polar response to determine the signal intensity and the likely source azimuth.

5. The method of claim 3, further comprising: cyclically monitoring each spectral window, wherein each cyclical iteration comprises first measuring the intensity of the spectral window having the highest intensity, and then adjusting the detection threshold in each subsequent lower spectral window by an amount associated with the intensity measured in higher windows.

6. The method of claim 3, further comprising: determining a normalization value based on the expected effect of scatter from high energy sources; and subtracting the normalization value from each signal intensity calculation.

7. The method of claim 3, further comprising providing a photodetector optically coupled to each scintillation crystal detector and wherein the calculating step comprises: comparing, for each photodetector, the electrical signal in a given spectral window to a stored history of signal measurements in the given spectral window to determine a signal intensity and a likely source azimuth.

8. The method of claim 3, further comprising: placing a further scintillation detector including a scintillation crystal at an angular offset to the other scintillation crystals, the other scintillation crystals being employed in a parallel plane ensemble, providing a photodetector optically coupled to each scintillation crystal detector; directing the further scintillation crystal outside of the parallel plane ensemble; and producing a further electrical signal for the further scintillation crystal at a further corresponding photodetector adjacent to the further scintillation crystal; wherein the calculating step comprises calculating from the further electrical signal and one or more of the electrical signals a signal intensity and likely three-dimensional source azimuth for at least one detected radioisotope.

9. The method of claim 8, further comprising: converting the signal intensity and likely three-dimensional source azimuth into likely three-dimensional source position data; transmitting the three-dimensional source position data to a video system; and overlaying, at the video system, the three-dimensional source position data wherein the video system overlays the three-dimensional source on a video image of an environment in which the method is performed.

10. The method of claim 3, wherein the analyzing step includes: calibrating at least one of the scintillation crystals and corresponding photodetectors based on a temperature sensor reading from a temperature sensor monitoring the scintillation crystal.

11. The method of claim 3, further comprising: identifying the detected radioisotope by its spectral distribution.

* * * * *